No. 606,977. Patented July 5, 1898.
C. McGLADE.
MEASURING DEVICE.
(Application filed Sept. 28, 1897.)

(No Model.)

Witnesses:
F. DeWitt Goodwin
S. Williamson

Inventor:
Cornelius McGlade
by Geo. H. Holgate
Attorney

UNITED STATES PATENT OFFICE.

CORNELIUS McGLADE, OF PHILADELPHIA, PENNSYLVANIA.

MEASURING DEVICE.

SPECIFICATION forming part of Letters Patent No. 606,977, dated July 5, 1898.

Application filed September 28, 1897. Serial No. 653,331. (No model.)

*To all whom it may concern:*

Be it known that I, CORNELIUS MCGLADE, a citizen of the United States, residing at Philadelphia, in the county of Philadelphia and State of Pennsylvania, have invented a certain new and useful Improvement in Measurring Devices, of which the following is a specification.

My invention relates to a new and useful improvement in measuring devices, and has for its object to provide an exceedingly simple and effective arrangement whereby liquid may be extracted from a bottle or other receptacle and the liquid so extracted measured and determined; and a further object of my invention is to prevent the escape or spilling of the liquid so measured.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
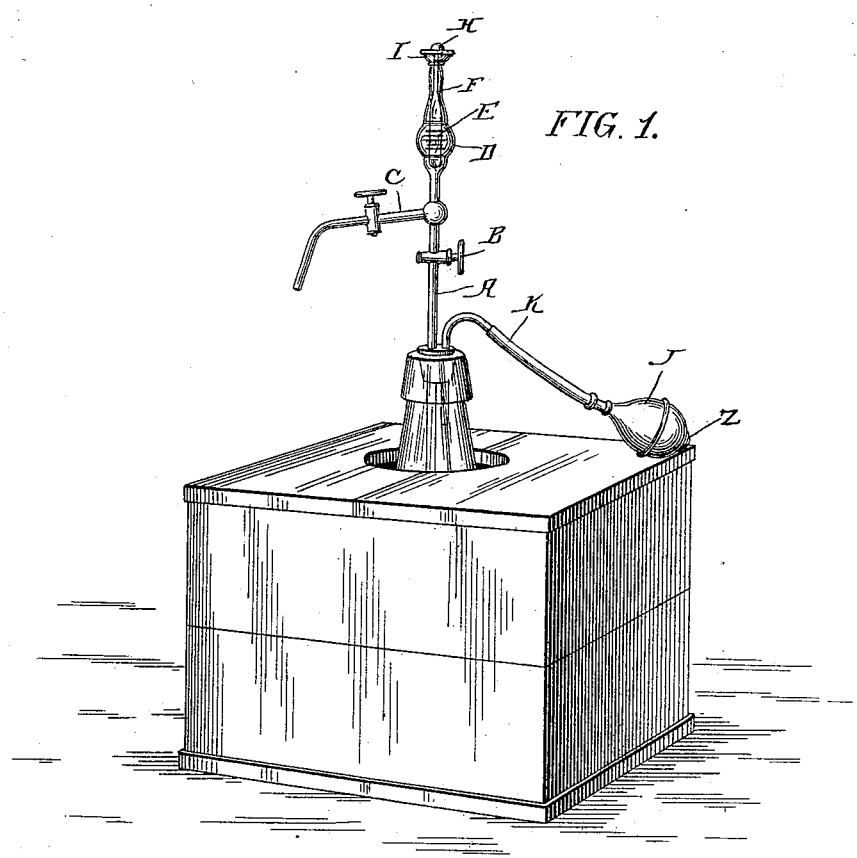
Figure 2:
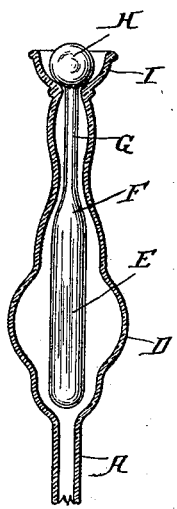

Figure 1 is a perspective of a carboy showing my improvement applied thereto; Fig. 2, an enlarged section of the measuring chamber or globe, showing the float and valve therein; and Fig. 3, a similar view of a modified form of my improvement adapting the same for the withdrawing and measuring of liquids from open receptacles.

In carrying out my invention as embodied in Figs. 1 and 2, A represents what is termed a "siphon-tube," adapted to be passed through the mouth of the bottle or other receptacle and extending within close proximity to the bottom of said receptacle. This tube has a valve B therein, and above said valve a faucet C leads from the tube and is so designed as to readily deliver liquid to any desired vessel.

A globe D of given capacity is formed upon the upper end of the tube A and serves as a chamber for the reception of the liquid when elevated from the receptacle and also as means for measuring said liquid, as will be hereinafter set forth, and within this globe is a float E, preferably of glass, having an air-cavity therein, and the upper portion of this float is so shaped as to serve as a valve, as indicated at F. An extension G is formed with the float and carries a knob H at the upper end thereof, which knob serves to hold the float sufficiently elevated to prevent the lower end thereof from closing the tube, as clearly shown in Fig. 2. A cup I, formed upon the upper portion of the chamber, is adapted to receive the knob and also to prevent the overflow of any small quantity of liquid which may be forced upward past the valve.

A force-pump or bulb J, having a valve 3, thus making it similar in all respects to those bulbs which are used in connection with atomizers, is connected with the receptacle by a suitable tube K, and in practice when it is desired to elevate a given quantity of liquid from the receptacle air under pressure is forced within the receptacle by the proper manipulation of the bulb, so that when the valve B is opened the liquid will rise through the tube A to the measuring-chamber, and when the proper quantity has reached this chamber the valve is closed and the liquid thus elevated drawn from the chamber by the opening of the faucet C. In permitting liquid to flow upward into the measuring-chamber the float will be elevated, thereby causing it to move upward and thus closing the passage from the chamber by the valve F becoming seated; but when the liquid is being withdrawn from the measuring-chamber this valve will fall from its seat, thereby venting the chamber and permitting the downward flow of the liquid. Either the lower end of the float or the knob H may be sufficiently weighted to prevent a too-sudden upward movement of the float when liquid is admitted to the measuring-chamber, and this weighting of the float will also tend to more readily release the valve from its seat when the faucet is opened.

In the operation of the device, should a small quantity of liquid escape through the passage from the measuring-chamber and reach the cup, it would be there retained until the float moved downward, when it would be drained backward into the chamber. If desired, the bottom of the cup may be slightly corrugated or the knob H may be roughened, so as to avoid the closing of the chamber against egress of air.

By this arrangement a given quantity of liquid may be quickly and conveniently withdrawn from a receptacle, such as a bottle, measured and delivered, and this without in any manner coming in contact with the hands of a person or being liable to be spilled, and this is of great importance in connection with the withdrawal and measuring of certain liquids, such as acids, as will be readily understood.

Any suitable graduations may be formed upon the globe for the determining of the quantity of liquid drawn.

Figure 3:
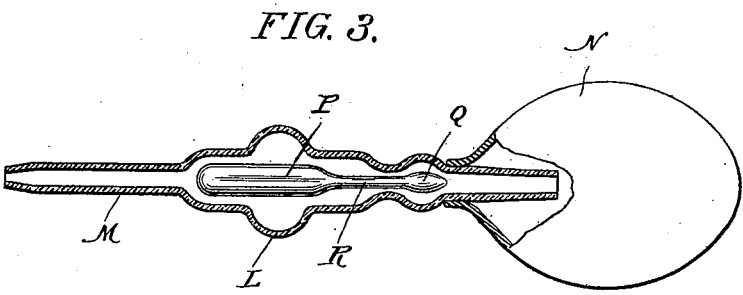

In the embodiment of my invention in Fig. 3 I provide a globe L, which serves as a measuring-chamber, and formed therewith is a tubular spout M for insertion in the liquid to be drawn and measured, while an exhaust-bulb N is attached to the extension O of the globe, so that by partially exhausting the air from this bulb and then placing the spout M in the liquid and permitting the bulb to expand the liquid will be drawn upward into the globe, where it may be measured by suitable graduations upon said globe, and when so measured may be again expelled by pressure upon the bulb. A float P is located within this globe and a knob Q formed upon the extension R thereto, so that when the proper amount of liquid is drawn within the globe the float will move upward and close the passage between said globe and bulb; but when the liquid is being expelled from the globe the float will fall, thus permitting air to pass from the bulb through the globe to bring about this result.

Other slight modifications might be made in the constructions here shown without departing from the spirit of my invention, the broad idea of which consists of a measuring-chamber having a float and valve located therein for closing the outlet from said chamber.

Having thus fully described my invention, what I claim as new and useful is—

1. The herein-described combination of a globe forming a chamber, a tube leading thereto, a cup formed upon an extension of the globe, a float located within the chamber, a valve formed upon the float adapted to close the passage leading from the chamber, an extension also formed upon the float, a knob carried by said extension adapted to fit within the cup, and a bulb for elevating the liquid within the globe, as specified.

2. The herein-described combination of a tube, a valve located therein, a faucet leading therefrom, a globe formed upon said tube, a cup formed upon an extension of the globe, a float located within the globe, a knob carried by an extension of the float and adapted to lie within the cup, and means for elevating the liquid within the globe, as specified.

In testimony whereof I have hereunto affixed my signature in the presence of two subscribing witnesses.

CORNELIUS McGLADE.

Witnesses:
S. S. WILLIAMSON,
FRANK S. TANEY.